(12) United States Patent
Flexman

(10) Patent No.: US 6,943,214 B2
(45) Date of Patent: Sep. 13, 2005

(54) TOUGHENED POLYOXYMETHYLENE-POLY (LACTIC ACID) COMPOSITIONS

(75) Inventor: Edmund Arthur Flexman, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/816,149

(22) Filed: Apr. 1, 2004

(65) Prior Publication Data

US 2004/0230001 A1 Nov. 18, 2004

Related U.S. Application Data

(60) Provisional application No. 60/470,083, filed on May 13, 2003, provisional application No. 60/471,023, filed on May 16, 2003, and provisional application No. 60/544,723, filed on Feb. 13, 2004.

(51) Int. Cl.$^7$ .............................................. C08L 59/00
(52) U.S. Cl. ...................... 525/154; 525/165; 264/452; 264/453
(58) Field of Search .................. 525/154, 165; 264/452, 453

(56) References Cited

U.S. PATENT DOCUMENTS 3,264,272 A   8/1966  Rees
4,187,358 A   2/1980  Kyo et al.
4,912,167 A   3/1990  Deyrup

FOREIGN PATENT DOCUMENTS

| EP | 1445282 A1 | 11/2004 |
| WO | WO 00/23520 A | 4/2000 |
| WO | WO 03/014224 A | 2/2003 |
| WO | WO03/014424 A1 | 2/2003 |

*Primary Examiner*—William K. Cheung

(57) ABSTRACT

Toughened polyoxymethylene-poly(lactic acid) resin compositions comprising polyoxymethylene, poly(lactic acid), and an impact modifier comprising an ethylene copolymer impact modifier made from monomers (a) ethylene; (b) one or more olefins of the formula $CH_2=C(R^1)CO_2R^2$, where $R^1$ is hydrogen or an alkyl group with 2–8 carbon atoms and $R^2$ is an alkyl group with 1–8 carbon atoms, such as methyl, ethyl, or butyl; and (c) one or more olefins of the formula $CH_2=C(R^3)CO_2R^4$, where $R^3$ is hydrogen or an alkyl group with 1–6 carbon atoms, such as methyl, and $R^4$ is glycidyl. The ethylene copolymer impact modifier may further be made from carbon monoxide monomers. The compositions may further comprise one or more ethylene/acrylate and/or ethylene/vinyl ester polymers, ionomers, and cationic grafting agents.

18 Claims, No Drawings

TOUGHENED POLYOXYMETHYLENE-POLY (LACTIC ACID) COMPOSITIONS

This application claims the benefit of U.S. Provisional Application No. 60/470,083 filed May 13, 2003, U.S. Provisional Application No. 60/471,023 filed May 16, 2003, and U.S. Provisional Application No. 60/544,723 filed Feb. 13, 2004, which is incorporated by reference herein for all purposes as if fully set forth.

FIELD OF THE INVENTION

The present invention relates to a toughened polyxomethylene and poly(lactic acid) composition. More particularly, the present invention relates to thermoplastic compositions comprising polyoxymethylene and poly(lactic acid) toughened with a random ethylene copolymer impact modifier comprising glycidyl groups. The compositions may further comprise one or more of ethylene/acrylate polymers, ionomers, and/or grafting catalysts.

BACKGROUND OF THE INVENTION

Poly(lactic acid) (i.e. PLA) can be derived biologically from naturally occurring sources other than petroleum and is biodegradable. However, physical limitations such as brittleness and slow crystallization may prevent easy injection molding of PLA into articles that have an acceptable degree of toughness for many applications without the use of modifiers.

Manufacturers and customers that use PLA to make a variety of articles are interested in improved toughness and improved injection molding processability and cycle times for articles made from this material.

Polyoxymethylene (POM or polyacetal) is a polymer whose physical properties include excellent tribology, hardness, moderate toughness and the ability to crystallize rapidly. POM was one of the last major engineering polymers to be highly impact modified because only a few of the available rubber type materials are sufficiently compatible to disperse in the melt into sufficiently small particles that then adhere sufficiently in the solid state to allow stress transfer across the rubber-matrix interface to improve its impact resistance.

The following disclosure may be relevant to various aspects of the present invention and may be briefly summarized as follows:

WO 03/014424 discloses blends of poly(lactic acid) with polyacetal resin that may contain impact modifiers. However, compositions with further improved toughness are desirable.

SUMMARY OF THE INVENTION

Briefly stated, and in accordance with one aspect of the present invention, there is provided a resin composition, comprising:

(i) about 1 to about 96 weight percent poly(lactic acid), (ii) about 1 to about 96 weight percent polyoxymethylene, and (iii) about 3 to about 40 weight percent of an impact modifier comprising an ethylene copolymer impact modifier derived from copolymerizing:

(a) about 20 to about 95 weight percent ethylene;

(b) about 3 to about 70 weight percent of one or more olefins of the formula $CH_2=C(R^1)CO_2R^2$, where $R^1$ is hydrogen or an alkyl group with 1–8 carbon atoms and $R^2$ is an alkyl group with 1–8 carbon atoms; and (c) about 0.5 to about 25 weight percent of one or more olefins of the formula $CH_2=C(R^3)CO_2R^4$, where $R^3$ is hydrogen or an alkyl group with 1–6 carbon atoms, and $R^4$ is glycidyl, wherein the weight percentages of the poly(lactic acid), polyoxymethylene, and the impact modifier are based on the total weight of the poly(lactic acid), polyoxymethylene, and the impact modifier.

Pursuant to another aspect of the present invention, there is provided a molded article, an extruded article, a sheet or a thermoformed article comprising the composition of the preceding paragraph.

DETAILED DESCRIPTION OF THE INVENTION

The present invention is a toughened thermoplastic resin composition comprising about 1 to about 96 weight percent polyoxymethylene (POM), about 1 to about 96 weight percent poly(lactic acid), and about 3 to about 40 weight percent of an impact modifier, where the weight percentages are based on the total weight of the composition. The impact modifier will comprise a random ethylene copolymer impact modifier and, optionally, other tougheners.

The polyoxymethylene (i.e. POM or polyacetal) used in the present invention can be one or more homopolymers, copolymers, or a mixture thereof. Homopolymers are prepared by polymerizing formaldehyde or formaldehyde equivalents, such as cyclic oligomers of formaldehyde. Copolymers can contain one or more comonomers generally used in preparing polyoxymethylene compositions. Commonly used comonomers include acetals and cyclic ethers that lead to the incorporation into the polymer chain of ether units with 2–12 sequential carbon atoms. If a copolymer is selected, the quantity of comonomer will not be more than 20 weight percent, preferably not more than 15 weight percent, and most preferably about two weight percent. Preferable comonomers are 1,3-dioxolane, ethylene oxide, and butylene oxide, where 1,3-dioxolane is more preferred, and preferable polyoxymethylene copolymers are copolymers where the quantity of comonomer is about 2 weight percent. It is also preferred that the homo- and copolymers are: 1) homopolymers whose terminal hydroxy groups are end-capped by a chemical reaction to form ester or ether groups; or, 2) copolymers that are not completely end-capped, but that have some free hydroxy ends from the comonomer unit or are terminated with ether groups. Preferred end groups for homopolymers are acetate and methoxy and preferred end groups for copolymers are hydroxy and methoxy.

The polyoxymethylenes used in the compositions of the present invention can be branched or linear and will generally have a number average molecular weight in the range of 10,000 to 150,000, preferably 20,000–90,000, and more preferably 25,000–70,000. The molecular weight can be conveniently measured by gel permeation chromatography in m-cresol at 160° C. using a DuPont PSM bimodal column kit with nominal pore size of 60 and 1000 Å. The molecular weight can also be measured by determining the melt flow using ASTM D1238 or ISO 1133. The melt flow will be in the range of 0.1 to 100 g/min, preferably from 0.5 to 60 g/min, or more preferably from 0.8 to 40 g/min. for injection molding purposes. Other structures and processes such as films, fibers, and blow molding may prefer other melt viscosity ranges. The POM will preferably be present in about 1 to about 99 weight percent, or more preferably in about 3 to about 97 weight percent, or yet more preferably in about 5 to about 95 weight percent, based on the total amount of POM and PLA.

As used in the present invention, the term "poly(lactic acid)" ("PLA") refers to poly(lactic acid) homopolymers and copolymers containing at least 50 mole percent of repeat units derived from lactic acid or its derivatives and mixtures thereof having a number average molecular weight of 3,000–1,000,000 or preferably 10,000–700,000 or more preferably 20,000–600,000. Preferably, the poly(lactic acid) used in the present invention will contain at least 70 mole percent of repeat units derived from (e.g. made by) lactic acid or its derivatives. The poly(lactic acid) homopolymers and copolymers used in the present invention can be derived from d-lactic acid, l-lactic acid, or a mixture thereof. A mixture of two or more poly(lactic acid) polymers can be used. Poly(lactic acid) is typically prepared by the catalyzed ring-opening polymerization of the dimeric cyclic ester of lactic acid, which is referred to as "lactide." As a result, poly(lactic acid) is also referred to as "polylactide." Poly (lactic acid) may also be made by living organisms such as bacteria or isolated from plant matter that include corn, sweet potatoes, and the like. Poly(lactic acid) made by such living organisms may have higher molecular weights than those made synthetically.

Copolymers of lactic acid are typically prepared by catalyzed copolymerization of lactide or another lactic acid derivative with one or more cyclic esters and/or dimeric cyclic esters. Typical comonomers are glycolide (1,4-dioxane-2,5-dione), the dimeric cyclic ester of glycolic acid; α,α-dimethyl-β-propiolactone, the cyclic ester of 2,2-dimethyl-3-hydroxypropanoic acid; β-butyrolactone, the cyclic ester of 3-hydroxybutyric acid, δ-valerolactone, the cyclic ester of 5-hydroxypentanoic acid; ε-caprolactone, the cyclic ester of 6-hydroxyhexanoic acid, and the lactone of its methyl substituted derivatives, such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, etc., the cyclic ester of 12-hydroxydodecanoic acid, and 2-p-dioxanone, the cyclic ester of 2-(2-hydroxyethyl)-glycolic acid. Aliphatic and aromatic diacid and diol monomers such as succinic acid, adipic acid, and terephthalic acid and ethylene glycol, 1,3-propanediol, and 1,4-butanediol may also be used. Copolymers may also be made by living organisms or isolated from plant matter as described above. The PLA will preferably comprise from about 1 to about 99 weight percent, or more preferably about 3 to 97 weight percent, or yet more preferably about 5 to about 95 weight percent of the composition of the present invention, based on the total amount of POM and PLA.

As used herein, the term "ethylene copolymer impact modifier" refers to a polymer derived from (e.g. made from) ethylene and at least two additional monomers.

The ethylene copolymer impact modifier used in the present invention is at least one random polymer made by polymerizing monomers (a) ethylene; (b) one or more olefins of the formula $CH_2=C(R^1)CO_2R^2$, where $R^1$ is hydrogen or an alkyl group with 1–8 carbon atoms and $R^2$ is an alkyl group with 1–8 carbon atoms, such as methyl, ethyl, or butyl; and (c) one or more olefins of the formula $CH_2=C(R^3)CO_2R^4$, where $R^3$ is hydrogen or an alkyl group with 1–6 carbon atoms, such as methyl, and $R^4$ is glycidyl. Preferred monomers (b) are butyl acrylates. One or more of n-butyl acrylate, tert-butyl acrylate, iso-butyl acrylate, and sec-butyl acrylate may be used. A preferred ethylene copolymer impact modifier is derived from ethylene, butyl acrylate, and glycidyl methacrylate and commonly referred to as E/BA/GMA. Repeat units derived from monomer (a) will comprise about 20 to about 95 weight percent, or preferably comprise about 20 to about 90 weight percent, or more preferably about 40 to about 90 weight percent, or most preferably comprise about 50 to 80 weight percent of the of the total weight of the ethylene copolymer impact modifier. Repeat units derived from monomer (b) will preferably comprise about 3 to about 70 weight percent, or more preferably about 3 to about 40 weight percent, or yet more preferably about 15 to about 35 weight percent, or even more preferably about 20 to about 35 weight percent of the total weight of the ethylene copolymer impact modifier. Repeat units derived from monomer (c) will preferably comprise about 0.5 to about 25 weight percent, or more preferably about 2 to about 20 weight percent, or yet more preferably about 3 to about 17 weight percent of the total weight of the ethylene copolymer impact modifier.

The ethylene copolymer impact modifier derived from the monomers (a)–(c) above, may additionally be derived from (d) carbon monoxide (CO) monomers. When present, repeat units derived from carbon monoxide will preferably comprise up to about 20 weight percent or more preferably comprise about 3 to about 15 weight percent of the total weight of the ethylene copolymer impact modifier.

The ethylene copolymer impact modifiers used in the composition of the present invention are random copolymers that can be prepared by direct polymerization of the foregoing monomers in the presence of a free-radical polymerization initiator at elevated temperatures, preferably about 100 to about 270° C., and more preferably about 130 to about 230° C., and at elevated pressures, preferably at least 70 MPa, and more preferably about 140 to about 350 MPa. The ethylene copolymer impact modifiers may also be prepared using a tubular process, an autoclave, or a combination thereof, or other suitable processes. The ethylene copolymer impact modifiers may be not fully uniform in repeat unit composition throughout the polymer chain due to imperfect mixing during polymerization or variable monomer concentrations during the course of the polymerization. The ethylene copolymer impact modifiers are not grafted or otherwise modified post-polymerization.

The amount of impact modifier will preferably be about 3 to about 40 weight percent, or more preferably about 4 to about 30 weight percent, or even more preferably about 8 to about 25 weight percent, based on the total weight of polyoxymethylene, poly(lactic acid), and impact modifier.

The impact modifier used in the present invention may further comprise one or more copolymers of ethylene and an acrylate ester such ethyl acrylate or butyl acrylate or a vinyl ester such as vinyl acetate. When used, the copolymers of ethylene and an acrylate ester or vinyl acetate will preferably be present in about 1 to about 50 weight percent, or more preferably in about 5 to about 40 weight percent, or yet more preferably in about 10 to about 30 weight percent, based on the total weight of the impact modifier.

The impact modifier used in the present invention may further comprise at least one optional ionomer toughening agent. By an ionomer is meant a carboxyl-group containing polymer that has been neutralized or partially neutralized with bivalent metal cations such as zinc, manganese, magnesium, cadmium, tin(II), cobalt(II), antimony(II), or and the like. Examples of ionomers are described in U.S. Pat. Nos. 3,264,272 and 4,187,358. Examples of suitable carboxyl group containing polymers include, but are not limited to, ethylene/acrylic acid copolymers and ethylene/methacrylic acid copolymers. The carboxyl group containing polymers may also be derived from one or more additional monomer, such as, but not limited to, butyl acrylate. Zinc(II) salts are preferred neutralizing agents. Ionomers are commercially available under the Suryln® trademark from E.I. du Pont de Nemours and Co., Wilmington, Del. When used, the ionomers will preferably be present in about 1 to about 75 weight percent, or more preferably in about 5 to about 60 weight percent, or yet more preferably in about 10 to about 50 weight percent, based on the total weight of the impact modifier.

The composition of the present invention may further comprise at least one optional grafting catalyst. Grafting catalysts are described in U.S. Pat. No. 4,912,167. The grafting catalyst is a source of catalytic cations such as $Al^{3+}$, $Cd^{2+}$, $Co^{2+}$, $Cu^{2+}$, $Fe^{2+}$, $In^{3+}$, $Mn^{2+}$, $Nd^{3+}$, $Sb^{3+}$, $Sn^{2+}$, and $Zn^{2+}$. Suitable grafting catalysts include, but are not limited to, salts of hydrocarbon mono-, di-, or polycarboxylic acids, such as acetic acid and stearic acid. Inorganic salts such as carbonates may also be used. Examples of preferred grafting catalysts include, but are not limited to, stannous octanoate, zinc stearate, zinc carbonate, and zinc diacetate (hydrated or anhydrous). When used the grafting catalyst will preferably comprise about 0.01 to about 3 parts by weight per hundred parts by weight of poly(lactic acid) and impact modifier.

The compositions of the present invention may also optionally further comprise other additives such as about 0.5 to about 5 weight percent plasticizer; about 0.1 to about 5 weight percent antioxidants and stabilizers; about 3 to about 40 weight percent fillers; about 5 to about 40 weight percent reinforcing agents; about 0.5 to about 10 weight percent nanocomposite reinforcing agents; and/or about 1 to about 40 weight percent flame retardants. Examples of suitable fillers include glass fibers and minerals such as precipitated $CaCO_3$, talc, and wollastonite.

In an embodiment of the present invention, the composition is prepared by melt blending the polyoxymethylene, poly(lactic acid), and ethylene copolymer impact modifier until they are homogeneously dispersed to the naked eye and do not delaminate upon injection molding. Other materials (e.g. ethylene-acrylate copolymers, ionomers, grafting agents, and other additives) may be also uniformly dispersed in the poly(lactic acid)-ethylene copolymer impact modifier matrix. The blend may be obtained by combining the component materials using any melt-mixing method known in the art. For example: 1) the component materials may be mixed to homogeneity using a melt-mixer such as a single or twin-screw extruder, blender, kneader, Banbury mixer, roll mixer, etc. to give a resin composition; or 2) a portion of the component materials can be mixed in a melt-mixer, and the rest of the component materials subsequently added and further melt-mixed until homogeneous.

The compositions of the present invention may be molded into articles using any suitable melt-processing technique. Commonly used melt-molding methods known in the art such as injection molding, extrusion molding, blow molding, and injection blow molding are preferred and injection molding is more preferred. The compositions of the present invention may be formed into films and sheets by extrusion to prepare both cast and blown films. These sheets may be further thermoformed into articles and structures that may be oriented from the melt or at a later stage in the processing of the composition. The sheets have a thickness of about at least 10 mils (0.010 inch). The films have a thickness of between 0 and 10 mils (0.010 inch). The films may also be part of a multilayer structure, wherein the film is coextruded or extrusion layered. The compositions of the present invention may also be used to form fibers and filaments that may be oriented from the melt or at a later stage in the processing of the composition. Examples of articles that may be formed from the compositions of the present invention include, but are not limited to, knobs, buttons, disposable eating utensils, thermoformable sheeting and the like. The present invention is also applicable to automotive applications.

EXAMPLES

Compounding: The compositions of the examples were prepared by compounding in a 30 mm co-rotating Werner & Pfleiderer twin screw extruder with a screw design comprising two hard working segments followed by a vacuum port and twin hole die. The molten material was discharged into a water quench tank prior to being cut by a strand cutter.

Molding: Molding was done on a 6-ounce reciprocating screw molding machine into an ASTM mold that made a single ⅛" tensile bar and two 5"×⅛" flexural bars using a screw speed of 60 rpm, a fast injection rate, and a back pressure of 50 psi.

Notched Izod impact strength measurements were made according to ASTM D256. Each ⅛" flexural bar was cut in half and each half was notched in the middle and tested.

| Poly-oxymethylene (POM) | Melt flow index test | | Polymer Type |
| --- | --- | --- | --- |
| | ASTM D1238 G/min | ISO 1133 G/min | |
| POM A | 1 | 2.2 | Polyacetal homopolymer with no additives |
| POM B | 1 | 2.2 | Delrin ® 100P, Manufactured by E.I. duPont de Nemours & Co., Wilmington, DE. |

-continued

| | Melt flow index test | | |
|---|---|---|---|
| Poly-oxymethylene (POM) | ASTM D1238 G/min | ISO 1133 G/min | Polymer Type |
| POM C | — | 9 | Delrin ® 460, Manufactured by E.I. duPont de Nemours & Co., Wilmington, DE. |
| POM D | — | 29 | Delrin ® 2700, Manufactured by E.I. duPont de Nemours & Co., Wilmington, DE. |
| POM E | — | 9 | Tenac ® 4520, Manufactured by Asahi Chemical Industry Co., Ltd. of Tokyo, Japan. |
| POM F | 5 | 12 | Delrin ® 525 GR, Manufactured by E.I. duPont de Nemours & Co., Wilmington, DE. |
| POM G | 7 | 15 | Delrin ® 500 P, Manufactured by E.I. duPont de Nemours & Co., Wilmington, DE. |

The PLA used in the following examples refers to a poly(lactic acid) homopolymer with an inherent viscosity of 1.49 as measured in 1:1 TFA/methylene chloride at 0.4 g/decaliter at 23° C. It contains minor amounts of normal commercial additives.

E/BA/GMA-5 is an ethylene/n-butyl acrylate/glycidyl methacrylate terpolymer derived from 66.75 weight percent ethylene, 28 weight percent n-butyl acrylate, and 5.25 weight percent glycidyl methacrylate. It has a melt index of 12 g/10 minutes as measured by ASTM method D1238.

E/BA/GMA-12 is an ethylene/n-butyl acrylate/glycidyl methacrylate terpolymer derived from 66 weight percent ethylene, 22 weight percent n-butyl acrylate, and 12 weight percent glycidyl methacrylate. It has a melt index of 8 g/10 minutes as measured by ASTM method D1238.

E/BA/GMA-17 is an ethylene/n-butyl acrylate/glycidyl methacrylate terpolymer derived from 63 weight percent ethylene, 20 weight percent n-butyl acrylate, and 17 weight percent glycidyl methacrylate. It has a melt index of 15 g/10 minutes as measured by ASTM method D1238.

E/GMA is an ethylene/glycidyl methacrylate copolymer derived from 98.2 weight percent ethylene and 1.8 weight percent glycidyl methacrylate.

E/BA is an ethylene/butyl acrylate copolymer derived from 27 weight percent butyl acrylate and 73 weight percent ethylene.

EPDM is a polymer derived from 68 weight percent ethylene, 28 weight percent propylene, and 4 weight percent 1,3-hexadiene and having a Mooney viscosity $ML_4$ at 250° C. of 35.

Ionomer refers to a terpolymer derived from 67 weight percent ethylene, 24 weight percent n-butyl acrylate, and 9 weight percent methacrylic acid and that has been 35% neutralized with zinc.

Comparative Examples 1–4

Each of the materials of the samples for each comparative example shown in Table 1 was compounded in a 30 mm extruder Werner and Pfleiderer twin screw extruder in which the barrels and die were heated to 200° C. The sample corresponding to Comparative Example 1 was extruded at 20 pounds per hour and those corresponding to Comparative Examples 2 and 3 and were extruded at about 25 pounds per hour. All samples were molded in a 6 ounce molding machine with a mold temperature of 60° C. with the exception of Comparative Example 4. Comparative Example 4 was molded in a mold at 80° C. The barrel and nozzle of the molding machine were set at 200° C. Each cycle consisted of a 30 second injection period and a 20 second hold period. The physical properties of the resulting blends are shown in Table 1. The weight percent of the materials in Table 1 are based on the total weight of the composition.

TABLE 1

| | Comp. Ex. 1 | Comp. Ex. 2 | Comp. Ex. 3 | Comp. Ex. 4 |
|---|---|---|---|---|
| Weight percent POM A | 90 | 70 | 50 | 30 |
| Weight percent PLA | 10 | 30 | 50 | 70 |
| Notched Izod (J/m) | 85.3 | 64.0 | 26.7 | 48.0 |

Examples 1–4

This set of examples demonstrates that POM/PLA blends were toughened by adding E/BA/GMA toughening agents. Each of the sample materials for each example shown in Table 2 was compounded in a 30 mm twin screw extruder with all materials being fed via the main feed throat in the rear of the extruder. Examples 1, 2, and 3 were fed at 30 pounds per hour and Example 4 at 35 pounds per hour. The extruder rpm was 75 rpm for examples 1 and 2, 100 rpm for Example 3, and 200 rpm for Example 4. Examples 1 to 3 were molded with a 60° C. mold temperature and injection pressures of 7475 psi, 7475 psi, and 9775 psi, respectively. Example 4 was molded with a 90° C. mold temperature with the barrels set at 200° C. and a 25/20 second inject/hold cycle at 11,500 psi injection pressure. The physical properties of the resulting blends are shown in Table 2. The ingredient quantities in Table 2 are given in weight percent based on the total weight of the composition.

TABLE 2

| | Ex. 1 | Ex. 2 | Ex. 3 | Ex. 4 |
|---|---|---|---|---|
| Weight percent POM A | 50 | 50 | 50 | 30 |
| Weight percent PLA | 30 | 30 | 30 | 50 |
| E/BA/GMA-5 | 20 | — | — | — |
| E/BA/GMA-12 | — | 20 | — | — |
| E/BA/GMA-17 | — | — | 20 | 20 |
| Notched Izod (J/m) | 95.9 | 119.9 | 490.4 | 151.9 |

Comparative Examples 5–9 and Examples 5–6

Each of the materials for each Comparative Example shown in Table 3 was compounded in a twin screw extruder with the barrels and die set to about 190–200° C. at 200 rpm. All materials were fed via the main feed throat in the rear of the extruder. The melt temperatures were about 225–232° C. The resulting compositions were molded into ASTM test bars and their physical properties were determined. The ingredient quantities in Table 3 are given in weight percent based on the total weight of the composition.

TABLE 3

|  | Comp. Ex. 5 | Comp. Ex. 6 | Comp. Ex. 7 | Ex. 5 | Comp. Ex. 8 | Comp. Ex. 9 | Comp. Ex. 10 | Comp. Ex. 11 | Ex. 6 |
|---|---|---|---|---|---|---|---|---|---|
| POM C | 40 | 40 | 40 | 40 | — | — | — | — | — |
| POM B | — | — | — | — | 40 | 40 | 40 | 40 | 40 |
| PLA | 45 | 45 | 45 | 45 | 45 | 45 | 45 | 45 | 45 |
| E/GMA | 15 | — | — | — | 15 | — | 7.5 | 7.5 | — |
| E/BA | — | 15 | — | — | — | 15 | — | 7.5 | — |
| EPDM | — | — | 15 | — | — | — | 7.5 | — | — |
| E/BA/GMA-12 | — | — | — | 15 | — | — | — | — | 15 |
| Notched Izod (J/m) | 27.8 | 37.4 | 28.8 | 52.9 | 27.8 | 39.0 | 29.4 | 32.0 | 54.5 |

Examples 7–24

Each of the materials for each Example shown in Tables 4–7 was compounded in a twin screw extruder with the barrels and die set to about 170° C. at about 150–200 rpm. The melt temperatures were about 205–230° C. All materials in Examples 11, 20, and 21 were fed via the main feed throat in the rear of the extruder. In the case of Examples 7–10, 12–19, and 22–24, the PLA, E/BA/GMA, and other additives were fed via the main feed throat in the rear of the extruder and the POM was side-fed to the extruder at a point at which the PLA, E/BA/GMA, and other additives were mixed. The resulting compositions were molded into ASTM test bars and their notched Izod impact resistance was determined. The ingredient quantities in Tables 4–7 are given in weight percent based on the total weight of the composition.

TABLE 4

|  | Ex. 7 | Ex. 8 | Ex. 9 | Ex. 10 |
|---|---|---|---|---|
| Weight percent POM D | 80 | 80 | 80 | 60 |
| Weight percent PLA | 10 | 10 | 10 | 20 |
| E/BA/GMA-12 | 10 | 10 | 10 | 20 |
| Zinc carbonate | — | 0.1 | — | — |
| Zinc stearate | — | — | 0.1 | — |
| Stannous octanoate | — | — | — | 0.03 |
| Notched Izod (J/m) | 55.0 | 58.7 | 70.5 | 103.6 |

TABLE 5

|  | Ex. 11 | Ex. 12 | Ex. 13 |
|---|---|---|---|
| Weight percent POM E | 70 | 70 | 60 |
| Weight percent PLA | 20 | 20 | 20 |
| E/BA/GMA-12 | 10 | 10 | 20 |
| Stannous octanoate | 0.03 | 0.03 | 0.03 |
| Notched Izod (J/m) | 76.4 | 112.1 | 96.7 |

TABLE 6

|  | Ex. 14 | Ex. 15 | Ex. 16 | Ex. 17 | Ex. 18 | Ex. 19 |
|---|---|---|---|---|---|---|
| Weight percent POM D | 60 | 60 | 60 | 60 | 60 | 60 |
| Weight percent PLA | 20 | 20 | 20 | 20 | 20 | 20 |
| E/BA/GMA-12 | 20 | 20 | 20 | 20 | 20 | 20 |
| Stannous octanoate | — | 0.003 | 0.01 | 0.03 | 0.1 | 0.3 |
| Notched Izod (J/m) | 101.5 | 128.2 | 112.1 | 96.1 | 96.1 | 117.5 |

TABLE 7

|  | Ex. 20 | Ex. 21 | Ex. 22 | Ex. 23 | Ex. 24 |
|---|---|---|---|---|---|
| POM G | 40 | 40 | 40 | 40 | — |
| POM F | — | — | — | — | 40 |
| PLA | 52 | 52 | 52 | 52 | 52 |
| E/BA/GMA-17 | 8 | 4 | — | — | — |
| E/BA/GMA-12 | — | — | 4 | 6 | 4 |
| Ionomer | — | 4 | 4 | 2 | 4 |
| Notched Izod (J/m) | 37.4 | 90.8 | 90.2 | 98.8 | 101.5 |

It is therefore, apparent that there has been provided in accordance with the present invention, a toughened polyoxymethylene-poly(lactic acid) composition and articles therefrom, that fully satisfy the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

It is claimed:

1. A resin composition, comprising:
    (iii) about 1 to about 96 weight percent poly(lactic acid),
    (iv) about 1 to about 96 weight percent polyoxymethylene, and
    (iii) about 3 to about 40 weight percent of an impact modifier comprising an ethylene copolymer impact modifier derived from copolymerizing:
        (a) about 20 to about 95 weight percent ethylene;
        (b) about 3 to about 70 weight percent of one or more olefins of the formula $CH_2{=}C(R^1)CO_2R^2$, where $R^1$ is hydrogen or an alkyl group with 1–8 carbon atoms and $R^2$ is an alkyl group with 1–8 carbon atoms; and
        (c) about 0.5 to about 25 weight percent of one or more olefins of the formula $CH_2{=}C(R^3)CO_2R^4$, where $R^3$ is hydrogen or an alkyl group with 1–6 carbon atoms, and $R^4$ is glycidyl,
    wherein the weight percentages of the poly(lactic acid), polyoxymethylene, and the impact modifier are based on the total weight of the poly(lactic acid), polyoxymethylene, and the impact modifier.

2. The composition of claim 1, wherein (a) is about 20 to about 90 weight percent ethylene.

3. The composition of claim 1, wherein (a) is about 40 to about 90 weight percent ethylene.

4. The composition of claim 1, wherein (a) is about 50 to about 80 weight percent ethylene.

5. The composition of claim 1, wherein (b) is about 20 to about 35 weight percent of one or more olefins of the formula $CH_2=C(R^1)CO_2R^2$, where $R^1$ is hydrogen or an alkyl group with 1–8 carbon atoms and $R^2$ is an alkyl group with 1–8 carbon atoms.

6. The composition of claim 1, wherein (c) is about 3 to about 17 weight percent of at least one olefin of the formula $CH_2=C(R^3)CO_2R^4$, where $R^3$ is hydrogen or an alkyl group with 1–6 carbon atoms, and $R^4$ is glycidyl.

7. The composition of claim 1, wherein the ethylene copolymer impact modifier is further derived from copolymerizing (d) 0 to about 20 weight percent carbon monoxide.

8. The composition of claim 1 wherein (b) is butyl acrylate and (c) is glycidyl methacrylate.

9. The composition of claim 1 wherein the impact modifier (iii) further comprises about 1 to about 75 weight percent of one or more ionomers, based on the total weight of the impact modifier.

10. The composition of claim 1, wherein the impact modifier (iii) further comprises 10 to 50 weight percent of one or more ionomers, based on the total weight of the impact modifier.

11. The composition of claim 1, wherein the impact modifier (iii) further comprises up to about 50 weight percent of one or more copolymers of ethylene and an acrylate ester or vinyl acetate, based on the total weight of the impact modifier.

12. The composition of claim 1, further comprising one or more cationic grafting catalysts.

13. The composition of claim 12, wherein the cationic grafting catalysts are selected from the group consisting of salts of hydrocarbon mono-, di-, or polycarboxylic acids.

14. The composition of claim 12 wherein the cationic grafting catalysts are one or more of stannous octanoate, zinc stearate, zinc carbonate, and zinc diacetate.

15. A molded article comprising the composition of claim 1.

16. An extruded article comprising the composition of claim 1.

17. A sheet comprising the composition of claim 1.

18. A thermoformed article made from the sheet according to claim 17.

* * * * *